(12) United States Patent
Berkner et al.

(10) Patent No.: US 12,490,890 B2
(45) Date of Patent: Dec. 9, 2025

(54) VIDEO ENDOSCOPE FOR FLUORESCENCE IMAGING

(71) Applicant: Olympus Winter & Ibe GmbH, Hamburg (DE)

(72) Inventors: Sebastian Berkner, Groenwohld (DE); Andreas Mueckner, Schwarzenbek (DE); Mario Bock, Hamburg (DE); Konrad Anders, Hamburg (DE)

(73) Assignee: OLYMPUS Winter & Ibe GmbH, Hamburg (DE)

( * ) Notice: Subject to any disclaimer, the term of this patent is extended or adjusted under 35 U.S.C. 154(b) by 31 days.

(21) Appl. No.: 18/583,143

(22) Filed: Feb. 21, 2024

(65) Prior Publication Data

US 2024/0285155 A1    Aug. 29, 2024

Related U.S. Application Data

(60) Provisional application No. 63/447,698, filed on Feb. 23, 2023.

(51) Int. Cl.
*A61B 1/04* (2006.01)
*A61B 1/05* (2006.01)
(Continued)

(52) U.S. Cl.
CPC ............... *A61B 1/043* (2013.01); *A61B 1/05* (2013.01); *A61B 1/0653* (2013.01); *H04N 23/11* (2023.01);
(Continued)

(58) Field of Classification Search
CPC ......... A61B 1/043; A61B 1/05; A61B 1/0653; A61B 1/00186; A61B 1/0638;
(Continued)

(56) References Cited

U.S. PATENT DOCUMENTS

| | | |
|---|---|---|
| 2011/0216061 A1 | 9/2011 | De La Barre et al. |
| 2012/0248333 A1 | 10/2012 | Fallert et al. |

(Continued)

FOREIGN PATENT DOCUMENTS

| | | | |
|---|---|---|---|
| EP | 2 505 989 A1 | 10/2012 | |
| WO | WO-2023045146 A1 | * | 3/2023 |
| WO | WO-2023219807 A1 | * | 11/2023 |

OTHER PUBLICATIONS

German Search Report dated Dec. 6, 2023 received in 10 2023 104 569.5.

(Continued)

*Primary Examiner* — Nasim N Nirjhar
(74) *Attorney, Agent, or Firm* — Scully, Scott, Murphy & Presser, P.C.

(57) ABSTRACT

A video endoscope for fluorescence imaging, with an elongate shaft and video camera at a distal end. The video camera includes an objective lens system and image acquisition system. The objective lens system configured to receive light and/or reflect from and to transmit the received light towards the image acquisition system. The image acquisition system includes: a beam splitter for splitting light first and second optical beam paths, first and second imaging chips for receiving light transmitted along the first and second beam paths, respectively. The beam splitter, and first and second imaging chips configured to facilitate concurrent acquisition of a white light image obtained by illuminating the target with white light and receiving light reflected from a target, and a fluorescence image obtained by illuminating the target with excitation light and receiving fluorescence light emitted by the target in response to illumination with excitation light.

19 Claims, 3 Drawing Sheets

(51) Int. Cl.
*A61B 1/06* (2006.01)
*H04N 23/11* (2023.01)
*H04N 23/16* (2023.01)
*H04N 23/50* (2023.01)
*H04N 25/131* (2023.01)

(52) U.S. Cl.
CPC ........... *H04N 23/16* (2023.01); *H04N 23/555* (2023.01); *H04N 25/131* (2023.01)

(58) Field of Classification Search
CPC ...... H04N 23/11; H04N 23/16; H04N 23/555; H04N 25/131; H04N 23/45; H04N 23/54; H04N 23/55
See application file for complete search history.

(56) References Cited

U.S. PATENT DOCUMENTS

2020/0337542 A1* 10/2020 Stewart ............. A61B 1/00193
2022/0183542 A1    6/2022 Baumann
2023/0199337 A1*  6/2023 Wang ........................ G06T 5/92
                                                                  348/240.2

OTHER PUBLICATIONS https://www.imec-int.com/en/articles/imec-introduces-three-new-hyperspectral-imaging-systems-outside-the-lab, archived via https://web.archive.org/web/20221126134141/https://www.imecint.com/en/articles/imec introduces-three-new-hyperspectral-imaging-systems-outside-the-lab Called on Jun. 12, 2023.

* cited by examiner

VIDEO ENDOSCOPE FOR FLUORESCENCE IMAGING

CROSS-REFERENCE TO RELATED APPLICATION

The present application is based upon and claims the benefit of priority from U.S. Provisional Application No. 63/447,698 filed on Feb. 23, 2023, the entire contents of which is incorporated herein by reference.

BACKGROUND

Field

The present disclosure relates to video endoscopes. In particular, the present invention relates to video endoscopes for fluorescence imaging.

Prior Art

In modern medicine, endoscopes are used for examining internal cavities or passageways of a patient. Therefore, endoscopes usually comprise an elongate shaft for introduction into the cavity or passageway of interest. At a distal end of the shaft, observation optics are provided for viewing or acquiring an image of the cavity of passageway of interest.

Modern video endoscopes usually comprise a video camera at the distal end of the shaft. The video camera comprises an objective lens system and an image acquisition system. The objective lens system usually comprises one or more lenses configured to project an image of the cavity or passageway of interest onto an image plane of the image acquisition system. The image acquisition system usually includes an imaging chip, like a CCD chip or a CMOS chip, and associated circuitry, for converting an image projected to the image plane of the image acquisition system into electronic signals, like video signals.

Conventional endoscopy uses visible light for examination of a cavity or passageway of interest. Therefore, illumination light is emitted at the distal end of the endoscope shaft towards the cavity or passageway of interest, and reflected light is received through the observation optics. Illumination light usually is white light. Imaging used in conventional endoscopy is often referred to as white light imaging.

In modern endoscopy, fluorescence imaging is sometimes used for obtaining enhanced images of the cavity or passageway of interest. Fluorescence imaging uses excitation light, which is absorbed by certain components of tissue, or by specific dyes provided to the tissue, and then re-emitted as fluorescence light at a different wavelength. Fluorescence imaging can so provide information about the concentration certain tissue components or dyes, which could not be obtained by white light imaging. Endoscopy using fluorescence imaging is also referred to as fluorescence endoscopy.

Depending on the specific tissue component or dye to be identified, excitation light may be UV light, visible light, or IR light. Fluorescence light generally has a longer wavelength than the excitation light. In most applications, fluorescence light is IR light.

During fluorescence endoscopy, it is often necessary to obtain an image comprising both information from white light imaging and from fluorescence imaging, so that information gained from fluorescence imaging can be mapped into anatomical structures visible through white light imaging. Here, it is problematic that the intensity of fluorescence light is usually much lower than the intensity of reflected light from white light imaging. At the same time, image acquisition systems of endoscopes are usually optimized for visible light, and therefore have a reduced sensitivity to IR light.

SUMMARY

An objective of the present disclosure is to provide a video endoscope which is improved for use in fluorescence imaging.

The present disclosures provides a video endoscope for fluorescence imaging, with an elongate shaft and a video camera disposed at a distal end of the elongate shaft; wherein the video camera comprises an objective lens system and an image acquisition system; the objective lens system being configured to receive light emitted and/or reflected from a target, and to transmit the received light towards the image acquisition system; wherein the image acquisition system comprises: a beam splitter for splitting light received from the objective lens system into a first optical beam path and a second optical beam path, a first imaging chip for receiving light transmitted along the first beam path, and a second imaging chip for receiving light transmitted along the second beam path; the beam splitter, the first imaging chip, and the second imaging chip being configured to facilitate concurrent acquisition of a white light image obtained by illuminating the target with white light and receiving light reflected from the target, and a fluorescence image obtained by illuminating the target with excitation light and receiving fluorescence light emitted by the target in response to illumination with excitation light.

The beam splitter may comprise a wavelength-selective tilter. The wavelength-selective filter may comprise a dichroic mirror. Dichroic mirrors usually comprise a sequence of thin film layers comprising different refractive indices, causing partial reflection at each layer interface. The partially reflected beams may interfere which each other depending on their wavelengths, so that, for some wavelengths, the reflected beams positively interfere, resulting in near-complete reflection of the respective light at the dichroic mirror, while for other wavelengths, the reflected beams cancel out each other, so that the respective light is nearly completely transmitted through the mirror.

While dichroic mirrors may be designed to reflect light only in a small wavelength band, in the context of the present disclosure a dichroic mirror with a broad reflection band may be used. In some embodiments, the wavelength-selective filter may be configured to direct visible light into the first beam path, and to direct IR light into the second beam path.

According to some embodiments, the first imaging chip of the video endoscope may be a polychromatic imaging chip comprising first color filters arranged in a pattern, e.g. a Bayer-pattern. Theoretically, imaging chips can only obtain grayscale images, as every pixel sensor can only determine the intensity of light reaching the sensor, but not the color thereof. For obtaining polychromatic or colored images, a pattern of color filters is usually applied to the pixel sensors, so that each pixel sensor only receives light of one basic color, like green, and blue. The color filters usually arranged in a checker board like pattern, wherein each square of four pixels has one pixel covered with a red color filter, one pixel covered with a blue color filter, and two pixels covered with a green color filter. Such color filter pattern is also known as Bayer-pattern.

In some embodiments, the second imaging chip may be a monochromatic imaging chip. In the context of the present disclosure, a monochromatic imaging chip is to be understood as an imaging chip not comprising any color filters. The second imaging chip may have a larger pixel size than the first imaging chip. A larger pixel size of the second imaging chip may allow for higher sensitivity of the second imaging chip, which may help to compensate for a lower intensity of fluorescence light.

In other embodiments, the second imaging chip may also be a polychromatic imaging chip comprising second color filters arranged in a pattern, e.g. a Bayer pattern. The first imaging chip and the second imaging chip may be laterally offset against each other in relation to an optical axis of the first beam path and the second beam path, respectively.

The first imaging chip and the second imaging chip are laterally offset against each other by about a half pixel pitch in an X-direction and by about a half pixel pitch in a Y-direction. By arranging the first imaging chip and the second imaging chip with a lateral offset of about half a pixel pitch in both the X-direction and the Y-direction, it is possible to apply a pixel shift algorithm for converting the images acquired by the first imaging chip and the second imaging chip into a combined image having higher resolution than single images acquired by the first and second imaging chips. It is therefore possible to provide the first imaging chip and the second imaging chip with a reduced spatial resolution without reducing the total spatial resolution of the video endoscope. Again, the reduced spatial resolution of the first and second imaging chips results in a higher sensitivity, so that fluorescence light can be detected at lower intensity.

The first color filters may have different colors than the second color filters, for example, the first color filters may include blue color filters, green color filters, and red color filters, like described above, while the second color filters may comprise red color filters, color filters of a first IR wavelength, and color filters of a second IR wavelength.

In some embodiments, the beam splitter may be non-wavelength-selective. The beam splitter may comprise a broadband partially reflective coating, which reflects about 50% of light in a wavelength band including both the visual wavelength band used in white light imaging and the IR wavelength band used in fluorescence imaging. In the context of the present disclosure, the term "non-wavelength-selective" is to be understood to say that, over the interesting wavelength range, transmission and reflection of the beam splitter are more or less equal, while small variations over the interesting wavelength may be acceptable. For example, the transmission and reflection may be in a range of 49% to 51%, 48% to 52%, or 45% to 55% over the interesting wavelength range.

Again, the first imaging chip may comprise color filters arranged in a pattern, and the second imaging chip is a monochromatic imaging chip. The first imaging chip may be used to acquire a colored image having a relatively low spatial resolution, and the second imaging chip may be used to acquire a monochromatic image having a higher spatial resolution. The images acquired by the first and second imaging chips may then be combined, using known image processing algorithms, to obtain a polychromatic image with a high spatial resolution.

In the present embodiment, the color filters may comprise a first set of color filters for passing visible light, and a second set of color filters passing IR light, for example, the first set of color filters may comprise blue color filters, green color filters, and red color filters, while the second set of color filters comprises color tilters for a first IR wavelength and color filters for a second IR wavelength. The color filters may be arranged in a 3×3 pattern. The 3×3 pattern may comprise two pixels with a blue color filter, two pixels with a green color filter, one pixel with a red color filter, two pixels with a first IR color filter, and two pixels with a second IR color filter.

BRIEF DESCRIPTION OF THE DRAWINGS

The subject of this disclosure is further described in more detail at hand of some exemplary embodiments and drawings. Such embodiments and drawings are only provided for better understanding the concept of the disclosure, without limiting the scope of protection, which is defined by the appended claims.

It will be appreciated that the following drawings are not necessarily drawn to scale. The drawings only show those elements necessary for understanding the subject of the disclosure, and may be simplified for better grasping the underlying concepts.

In the drawings:

FIG. 1 illustrates a fluorescence endoscopy system;

FIG. 2 illustrates a schematic view of a video camera of a video endoscope;

FIG. 3 illustrates a schematic view of imaging chips of a first embodiment;

FIG. 4 illustrates a schematic view of imaging chips of a second embodiment; and FIG. 5 illustrates a schematic view of imaging chips of a third embodiment.

DETAILED DESCRIPTION

Figure 1:
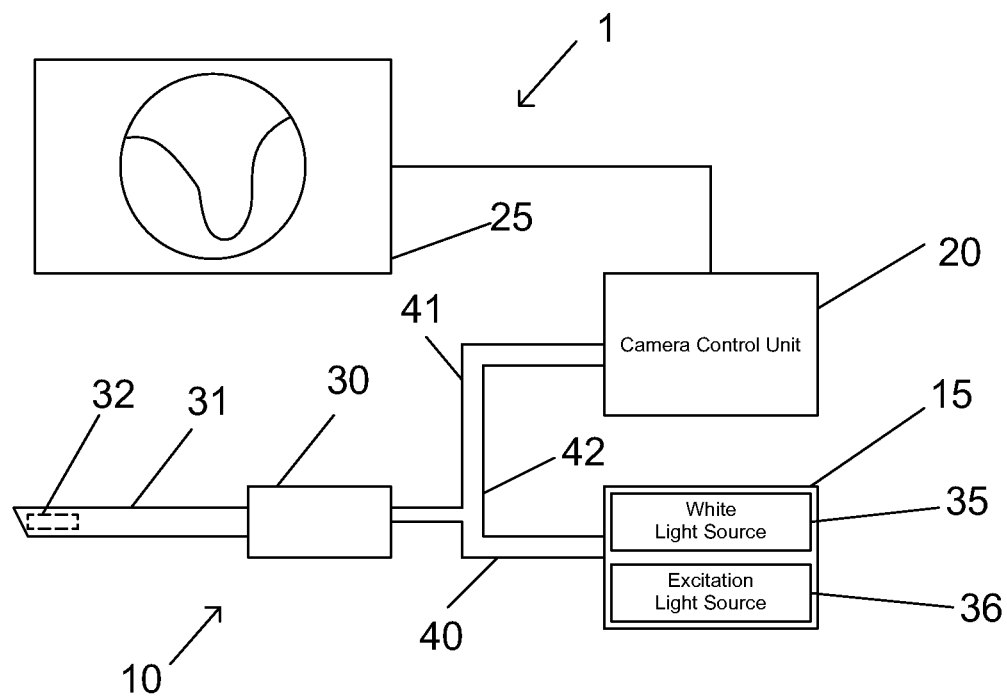

FIG. 1 shows a system for fluorescence endoscopy, also referred to as fluorescence endoscopy system 1, comprising a video endoscope 10, a light source unit 15, a camera control unit 20, and a display 25.

The video endoscope 10 comprises a main body 30 and an elongate shaft 31. At a distal end of the elongate shaft 31, a video camera 32 is provided. The video camera 32 is shown in dashed lines as it is normally hidden inside the elongate shaft 31.

The light source unit 15 comprises a white light source 35 and an excitation light source 36. The white light source 35 may comprise a halogen bulb, a Xenon lamp, or one or more LED light sources. Depending on the required wavelength of excitation light, the excitation light source 36 may comprise an Hg lamp, an UV LED, an IR LED, a laser diode, or the like. Instead of separated light sources for white light and excitation light, the light source unit 15 may comprise a broadband light source and associated filters that can be selectively activated or deactivated to allow passing of white light and/or excitation light.

Light from the light source unit 15 is directed to the video endoscope 10 through a light guide cable 40.

The camera control unit 20 provides control signals to, and receives video signals from, the video camera 32 through a signal cable 41. In the camera control unit 20, the video signals received from the video endoscope 10 are processed for display on the display 25. In addition to being displayed, the video signals may also be recorded on a memory (not shown) for later retrieval and evaluation.

The camera control unit 20 may further communicate with the light source unit 15 through a control cable 42. For example, the camera control unit 20 may send commands to the light source unit 15 to activate and/or deactivate the white light source 35, the excitation light source 36, or both.

The light source cable 40, the signal cable 41, and the control cable 42 may be integrated into a single cable unit fixedly attached to the video endoscope 10, and releasably attached to the light source unit 15 and the camera control unit 20 through appropriate connectors like plugs, or the like. An additional control cable (not shown) may be provided between the camera control unit 20 and the light source unit 15, or the control cable 42 may be provided as separate cable not being part of the cable unit.

Suitable light source units 15 and camera control units 20 are available for example from the Olympus Corporation of the Americas, 3500 Corporate Parkway. PA 18034, Center Valley, USA.

Figure 2:
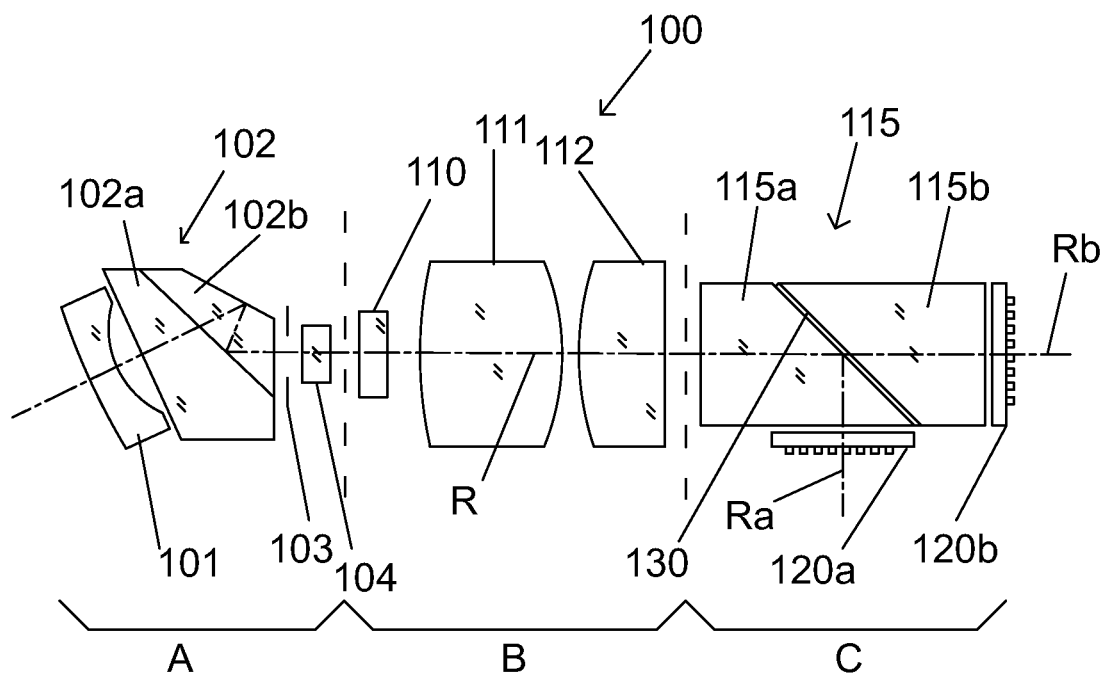

FIG. 2 shows a video camera 100 of a video endoscope, which may be the video endoscope 10 of FIG. 1. For better understanding, only optical components of the video camera 100 are shown, while mechanical components for holding the optical components are omitted.

The optical system of the video camera 100 comprises a distal meniscus lens 101, a deflection prism block 102 with deflection prisms 102*a*, 102*b*, an aperture stop 103, and first planar block 104, which together form a distal section A. The optical system further comprises a second planar block 110, a biconvex lens 111, and a plano-convex lens 112, which together form a middle section 13. In some embodiments, the lens 112 may also be a biconvex lens. The optical system further comprises a beam splitter prism block 115 with beam splitter prisms 115*a*, 115*b*, and first and second imaging chips 120*a*, 120*b*, together forming a proximal section C. An optical axis of the optical system is shown as line R. and splits up in the beam splitter block 115, as shown by lines Ra, Rb.

The video camera 100 is configured to provide an oblique direction of view (DOV). This enables a user to cover an enlarged viewing field by rotating the video endoscope about a longitudinal axis. The oblique DOV is provided by the deflection prism block 102, in which light entering through the distal meniscus lens 101 is deflected towards a main axis of the optical system through multiple reflections. The lenses 111 and 112 focus light reflected or emitted by an anatomical structure of interest towards the imaging chips 120*a*, 120*b*.

When a user rotates the video endoscope to change the direction of view, an image displayed on e.g. on the monitor 25 would also rotate, which would make it difficult for a user to navigate in the image. To avoid this, the middle section B and the proximal section C of the video camera 100 are rotatably held in the video endoscope, and can be controlled by a separate rotation ring (not shown). The user can so hold the imaging chips 120*a*, 120*b* in a fixed position while the video endoscope rotates, so that a horizontal orientation of the endoscope image remains stable. The planar blocks 104, 105 serve as optical windows of respective sealed housings of the distal section A and the middle and proximal sections B, C.

For use in fluorescence imaging, the video camera 100 comprises a beam splitter, which is now described in more detail. In the embodiment shown in FIG. 2, the proximal section C of the video camera 100 comprises a beam splitter prism block 115 with a first beam splitter prism 115*a* and a second beam splitter prism 115*b*, which abut at an inclined surface with a functional coating 130 between them. Light entering the proximal section C hits the inclined surface at an angle of about 45°. Depending on the type of the functional coating 130, the light is partially reflected at the inclined surface towards imaging chip 120*a*, and partially transmitted towards imaging chip 120*b*, so that an image of the anatomical structure of interest is formed on both imaging chips 120*a*, 120*b*.

In a first embodiment, the functional coating 130 includes a dichroic coating comprising multiple thin layers of different dielectrics. By fine tuning of the thicknesses and the refractive indexes of the single layers, a dichroic coating can provide a high reflectivity for light of a certain wavelength range, while light outside of that wavelength range is transmitted with high efficiency. The dichroic coating acts as a dichroic mirror, configured to reflect light in the visible wavelength range (ca. 380 nm-750 nm) towards the first imaging chip 120*a*, and to transmit the remaining light, mainly in the IR wavelength range, towards the second imaging chip 120*b*.

In this embodiment, the first imaging chip 120*a* may be a silicon-based CCD or CMOS sensor providing a plurality of individual sensors (pixels) in a rectangular matrix, and a color filter associated with each single pixel sensor. A typical color filter scheme involves one red filter, one blue filter, and two green filters in a 2×2 matrix, known as a Bayer-filter.

The second imaging chip 120*b* may also be a silicon-based CCD or CMOS sensor, or may be a germanium-based CCD or CMOS sensor. A germanium-based sensor can be used for the second imaging chip 120*b* for an increased sensitivity in the IR wavelength range.

During fluorescence endoscopy, the fluorescence light usually has a much lower intensity than the visual light obtained by white light illumination. Therefore, the second imaging chip 120*b* of the present embodiment is optimized for higher sensitivity. The second imaging chip 120*b* may have larger pixel sensors than the first imaging chip 120*a* for collecting more light, and consequently have a smaller number of pixels. In one example, each pixel sensor of the second imaging chip 120*b* may be as large as a group of four pixel sensors of the first imaging chip 120*a* forming a group of the Bayer-filter. Instead of having larger pixel sensors, the electrical signals of a plurality of pixel sensors of the second imaging chip 120*b* may be added electronically. Such operation is also known as binning.

The second imaging chip 120*b* may not have associated color filters, and is configured to acquire a monochromatic image in the fluorescence wavelength range.

Figure 3:
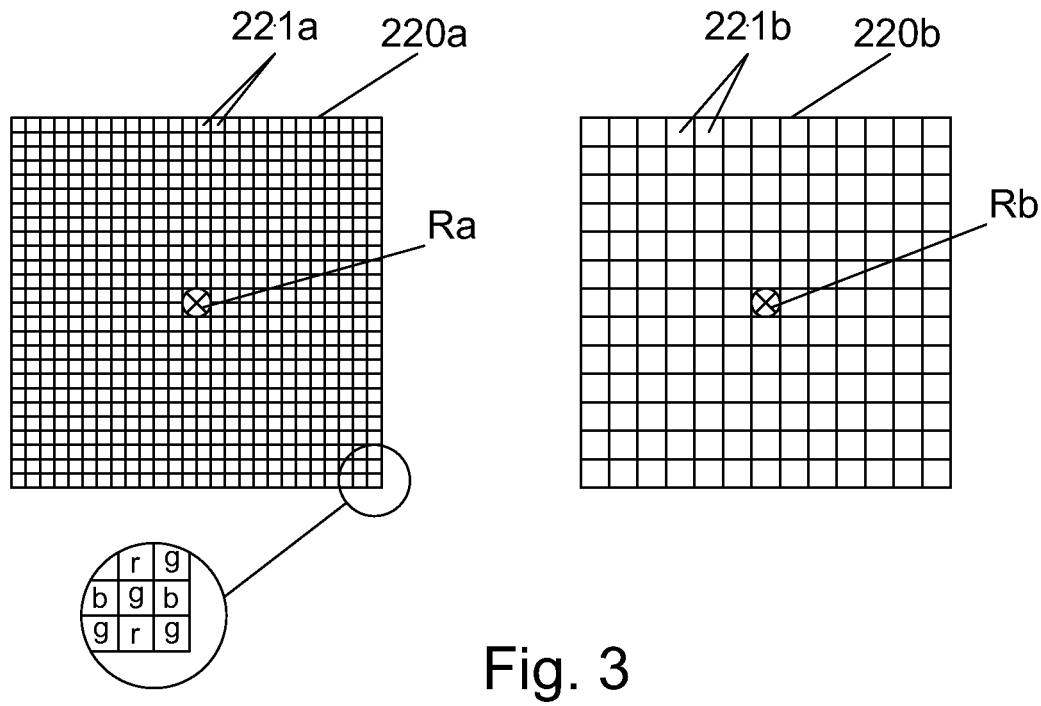

FIG. 3 shows a schematic view of two imaging chips 220*a*, 220*b* as used with the first embodiment. The first imaging chip 220*a* comprises a number of pixel sensors 221*a* arranged in a rectangular matrix. While FIG. 3 shows a matrix of 26×26 pixel sensors 221, a much larger number of pixel sensors 22*a* can be used in practice, e.g. 4096×2160 pixel sensors in an UHD video endoscope. The detail view of FIG. 3 shows the color filter scheme on the imaging sensor 220*a*, wherein on red color filter "r", two green color filters "g", and one blue color filter "b" are associated with each 2×2 square of pixel sensors 221*a*. Such color filter scheme is also known as "Bayer filter".

The imaging chip 220*b* also comprises a rectangular array of pixel sensors 221*b*. The pixel sensors 221*b* have 4 times the size of the pixel sensors 221*a*, and the imaging chip 220*b* has 4 times less imaging sensors 221*b* than the imaging chip 220*a*. Other than the imaging chip 220*a*, the imaging chip 220*b* does not comprise color filters.

The imaging chips 220*a*, 220*b* are both centrally aligned with an optical axis Ra, Rb of their respective optical paths, as indicated by the crossed lines in the center of the imaging chips 220*a*, 220*b*.

Figure 4:
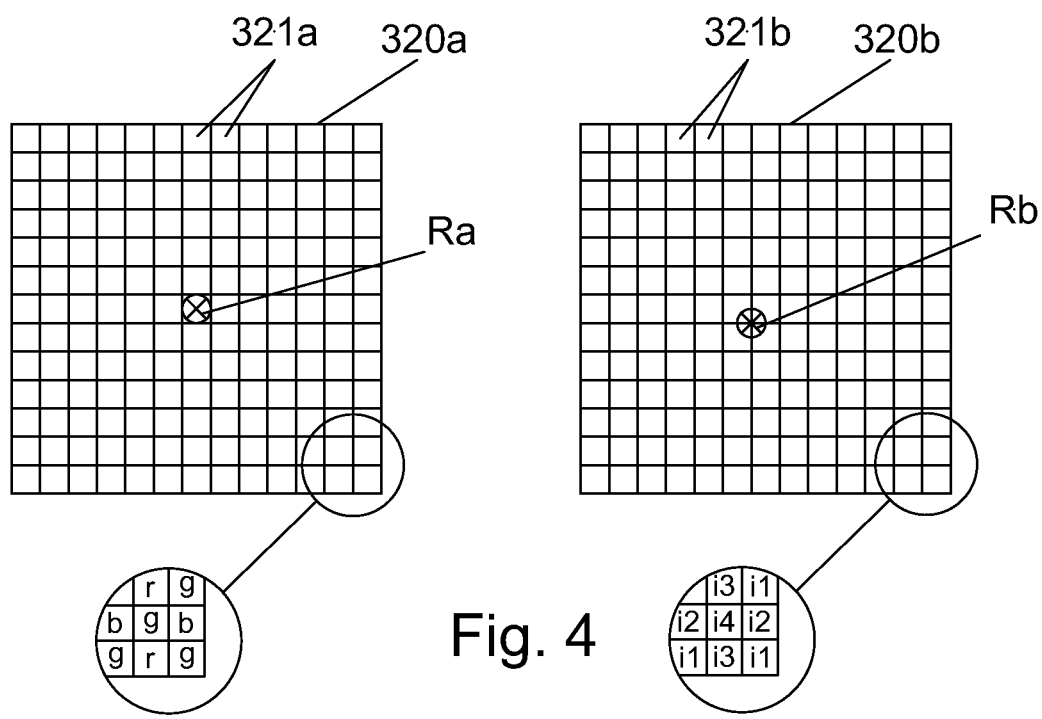

In a second embodiment, also employing the dichroic coating as described above with respect to the first embodiment, the first and second imaging chips may have the same pixel sensor size and may both have associated color filters. First and second imaging chips 320a, 320b for use with the second embodiment are shown in FIG. 4. In the second embodiment, the size pixel sensors 321a, 321b of the first and second imaging chips 320a, 320b may be increased in comparison with known video endoscopes, and therefore the pixel count of the first and second imaging chips 320a, 320b may be reduced. To compensate for this, the first and second imaging chips 320a, 320b may be laterally offset against each other with respect to an optical axis Ra, Rb of their respective beam paths. The offset may be half the distance between two adjacent pixel sensors in an X-direction and a Y-direction, as shown in FIG. 4 by the respective crossed lines. The images acquired by the first and second imaging chips 320a, 320b may afterwards be processed by known image processing techniques for obtaining a combined image with an increased resolution, like the pixel-shift algorithm. In this embodiment, the sensitivity of the second imaging chip 320b is increased due to the larger pixel sensors, and the color filters associated with the second imaging chip 320b may serve to distinguish between several fluorescence dyes. The detail views of FIG. 4 show that color filters associated with the first imaging chip 320a follow the same pattern as those of the first imaging chip 220a of the first embodiment. The color filters associated with the second imaging chip 320b comprise a first IR wavelength filter "i1", a second IR wavelength filter "i2", a third IR wavelength filter "i3", and a fourth IR wavelength filter "i4". The second imaging chip 320b may so be used to acquire fluorescence images, in which emission from four different fluorescence dyes can be distinguished.

In a third embodiment, the functional coating 130 is selected to provide non-wavelength-selective beam splitting. The functional coating 130 of this embodiment may include thin metal layers comprising the desired reflectivity over a broad wavelength range. For example, the functional coating may comprise an aluminium layer for providing reflection in the visible wavelength range, and a gold layer for reflection in the IR wavelength range. Alternatively, the functional coating 130 may comprise a number of thin dielectric layers similar to the functional coating 130 of the first and second embodiments, which are configured to provide the required reflectivity over the wavelength range of interest.

Figure 5:
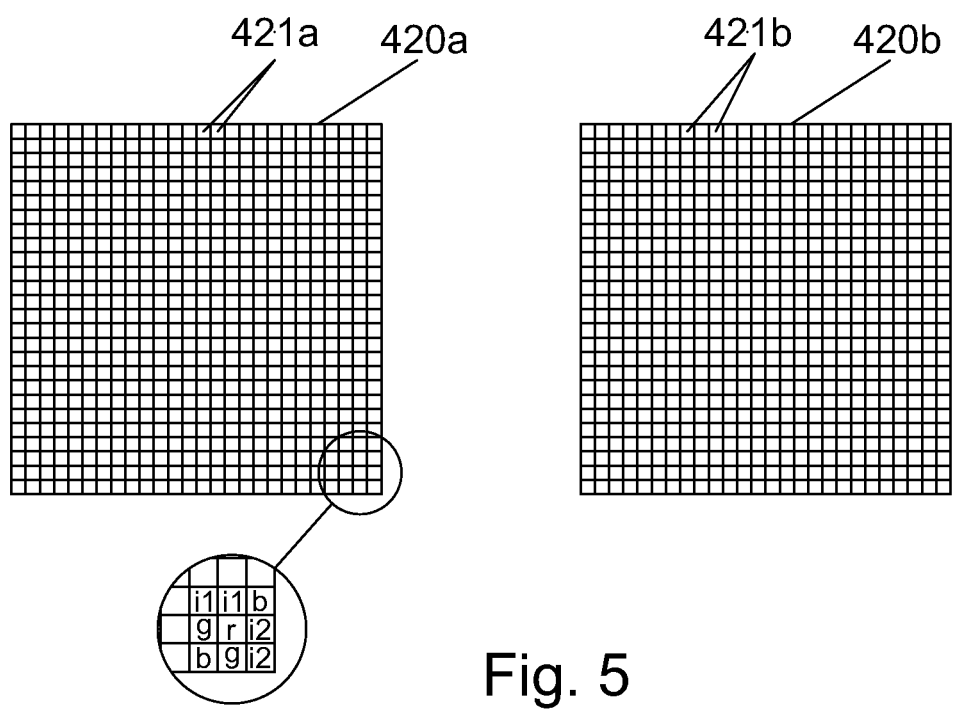

First and second imaging chips 420a, 420b for use in the third embodiment are shown in FIG. 5. In the third embodiment, the first imaging chip 420a is associated with an extended color filter pattern, wherein each square group of 3×3 pixel sensors 421a comprises two blue color filters "b", two green color filters "g", one red color filter "r", two color filters for a first IR wavelength "i1", and two color filters for a second IR wavelength "i2". The second imaging chip 420b has a high spatial resolution and a high number of pixel sensors 421b. For example, the pixel sensors 421b may have the same size and pitch as the pixel sensors 421a of the first imaging chip 420a. In other examples, the second imaging chip 420b may have an even higher spatial resolution that the first imaging chip 420a. The second imaging chip 420b is not associated with color filters.

In the third embodiment, the first imaging chip 420a acquires a first image with small spatial resolution due to the high number of color filters, but with enhanced color information covering both the visible wavelength band for white-light images and the IR wavelength band for fluorescence images. The second imaging chip 420b acquires a monochromatic image not carrying any color information. The two images can then be combined by known image processing algorithms to obtain a composite image having the full color information for both white-light images and fluorescence images, and the high spatial resolution of the second imaging chip 420b.

While there has been shown and described what is considered to be embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that can fall within the scope of the appended claims.

The invention claimed is:

1. A video endoscope for fluorescence imaging, the video endoscope comprising:
   an elongate shaft; and
   a video camera disposed at a distal end of the elongate shaft;
   wherein the video camera comprises an objective lens system and an image acquisition system;
   the objective lens system being configured to receive light one or more of emitted and reflected from a target, and to transmit the received light towards the image acquisition system;
   the image acquisition system comprises:
      a beam splitter for splitting light received from the objective lens system into a first optical beam path and a second optical beam path,
      a first imaging chip for receiving light transmitted along the first beam path, and
      a second imaging chip for receiving light transmitted along the second beam path; and
   the beam splitter, the first imaging chip, and the second imaging chip being configured to facilitate concurrent acquisition of a white light image obtained by illuminating the target with white light and receiving light reflected from the target, and a fluorescence image obtained by illuminating the target with excitation light and receiving fluorescence light emitted by the target in response to illumination with excitation light;
   wherein a first position of the first optical axis relative to a first center of the first chip is different from a second position of the second optical axis relative to a second center of the second chip.

2. The video endoscope of claim 1, wherein the beam splitter comprises a wavelength-selective filter.

3. The video endoscope of claim 2, wherein the wavelength-selective filter comprises a dichroic mirror.

4. The video endoscope of claim 2, wherein the wavelength-selective filter is configured to direct visible light into the first beam path, and to direct IR light into the second beam path.

5. The video endoscope of claim 1, wherein the first imaging chip is a polychromatic imaging chip comprising first color filters arranged in a pattern.

6. The video endoscope of claim 5, wherein the pattern is a Bayer-pattern.

7. The video endoscope of claim 1, wherein the second imaging chip is a monochromatic imaging chip.

8. The video endoscope of claim 7, wherein the second imaging chip has a larger pixel size than a pixel size of the first imaging chip.

9. The video endoscope of claim 5, wherein the second imaging chip is a polychromatic imaging chip comprising second color filters arranged in a pattern.

10. The video endoscope of claim 9, wherein the pattern is a Bayer pattern.

11. The video endoscope of claim 1, wherein the first imaging chip and the second imaging chip are laterally offset against each other by a half pixel pitch in an X-direction and by a half pixel pitch in a Y-direction.

12. The video endoscope of claim 1, wherein the first color filters have different colors than the second color filters.

13. Video endoscope of claim 9, wherein the first color filters have different colors than the second color filters.

14. The video endoscope of claim 11, wherein the first color filters have different colors than the second color filters.

15. The video endoscope of claim 1, wherein the beam splitter is non-wavelength-selective.

16. The video endoscope of claim 15, wherein the first imaging chip comprises color filters arranged in a pattern, and the second imaging chip is a monochromatic imaging chip.

17. The video endoscope of claim 16, wherein the color filters comprise a first set of color filters for passing visible light, and a second set of color filters passing IR light.

18. The video endoscope of claim 17, wherein the color filters are arranged in a 3×3 pattern.

19. The video endoscope of claim 1, wherein the first position is coincident with the first center and the second position is laterally offset from the second center.

* * * * *